United States Patent [19]

Mizuguchi et al.

[11] Patent Number: 5,076,026
[45] Date of Patent: Dec. 31, 1991

[54] MICROSCOPIC GRINDING METHOD AND MICROSCOPIC GRINDING DEVICE

[75] Inventors: Shinichi Mizuguchi, Katano; Syuji Ueda, Neyagawa; Kouji Kato, Sendai; Noritsugu Umehara, both of Sendai, all of Japan

[73] Assignee: Electric Industrial Co., Ltd. Matsushita, Osaka, Japan

[21] Appl. No.: 621,430

[22] Filed: Dec. 4, 1990

[30] Foreign Application Priority Data

Dec. 4, 1989 [JP] Japan ................... 1-314716

[51] Int. Cl.$^5$ ............................................. B24B 1/00
[52] U.S. Cl. ............................ 51/317; 51/59 SS
[58] Field of Search ............... 51/317, 59 SS, 7, 57, 51/58

[56] References Cited

U.S. PATENT DOCUMENTS

| 4,122,602 | 10/1978 | Sastn et al. | 51/59 SS |
| 4,169,713 | 10/1979 | Chachin et al. | 51/7 |
| 4,186,528 | 2/1980 | Yascheritsyn | 51/7 |
| 4,211,041 | 7/1980 | Sakulevich et al. | 51/7 |
| 4,821,466 | 4/1989 | Kato et al. | 51/317 |
| 4,920,705 | 5/1990 | Lipukhin et al. | 51/7 |
| 4,977,707 | 12/1990 | Chachin et al. | 51/317 |

Primary Examiner—M. Rachuba
Attorney, Agent, or Firm—Wenderoth, Lind & Ponack

[57] ABSTRACT

A microscopic grinding device grinds a workpiece at ultrahigh precision with the use of magnetic grinding fluid actuated microscopically in three dimensional directions by Z- and XY-axis actuators. The magnetic grinding fluid is magnetically supported between a grinding member and the workpiece by the magnetic field. Because magnetic field is generated to form a magnetic circuit within the device itself where no workpiece is necessary to form the magnetic circuit, the device can be used with equal results even with workpieces made from non-magnetic material. The pressure applied to the workpiece by the grinding member via the magnetic grinding fluid is detected by a load cell for feeding back a signal indicative of the detected pressure to the controller. The controller controls the actuators to actuate the grinding member such that the pressure applied from the grinding member, via the magnetic fluid, to the workpiece is maintained within a predetermined range.

11 Claims, 5 Drawing Sheets

To Z-DRIVE AMP.

To X-DRIVE AMP.

To Y-DRIVE AMP.

X-axis signal
(To X-DRIVE AMP.)

Y-axis signal
(To Y-DRIVE AMP.)

90° phase

MICROSCOPIC GRINDING METHOD AND MICROSCOPIC GRINDING DEVICE

BACKGROUND OF THE INVENTION

1. Field of the Invention

The present invention relates to a microscopic grinding method and to a microscopic grinding device, and more particularly, to a method of precision grinding a minute area to achieve ultrahigh precision processing in such fields as the manufacture of lenses and other optical devices, and to a polishing unit used in said method.

2. Description of the Prior Art

X-ray optical elements and aspherical lenses used in a variety of electronics and optical devices are manufactured with grinding and polishing processes, but these processes typically require microscopic grinding precision to achieve shapes precise to a maximum 0.01 μm. This requires methods enabling extremely high precision grinding within an extremely minute area.

Polishing and lapping are two widely used conventional high precision grinding methods, but these methods cannot achieve ultrahigh precision grinding on the order of a maximum 0.01 μm. Magnetic grinding methods using a magnetic fluid or magnetic grinding agent have gained attention in recent years as methods of achieving higher precision than is possible with the aforementioned methods.

A magnetic single body or magnetic grinding fluid with a granular grinding agent suspension dispersed in a magnetic fluid are used in magnetic grinding methods. This magnetic grinding fluid is supplied between the tip of the grinding tool and the workpiece and a magnetic field is applied between the grinding tool and workpiece to hold the magnetic grinding fluid between the grinding tool and workpiece. The magnetic grinding fluid is thus held by this magnetic action in a state with pressure applied to the grinding surface of the workpiece. If in this state the grinding tool is rotated at high speed, the magnetic grinding fluid is pulled and moved by the rotation of the grinding tool, causing the grinding agent grains suspended in the magnetic grinding fluid to collide with the workpiece, and thereby grinding the workpiece surface. By varying the direction and strength of the magnetic field, the applied pressure of the magnetic grinding fluid on the grinding surface can be adjusted, the action of the grinding agent grains suspended in the magnetic grinding fluid can be controlled, and grinding performance can be improved.

A grinding device or method for grinding a workpiece with the use of magnetic grinding fluid, for example, Japanese Laid-open Patent Publication No. 60-118466 published June 25, 1985, Japanese Patent Publication (examined) No. 1-16623 published Mar. 27, 1989 or Japanese Patent Publication (examined) No. 1-16623, published Mar. 27, 1989, is disclosed.

According to Japanese Laid-open Patent Publication No. 60-118466, the magnetic grinding fluid is gathered by a magnetic field which is generated by an array of magnets arranged such that the magnetic pole of any two adjacent magnets are opposite to each other.

According to Japanese Laid-open Patent Publication No. 61-244457, the rotating magnetic field is formed between the grinding tool and the workpiece.

According to Japanese Patent Publication (examined) No. 1-16623, the workpiece is dipped into the grinding fluid and placed between the rotating lapping tool and an opposed iron core where a static magnetic field is formed to tract and concentrate the magnetic grinding fluid to a gap formed between the workpiece and the rotating lapping tool.

Because the action of the grinding agent can be focused by the magnetic retention force on a minute region of the workpiece using this magnetic grinding method, grinding and polishing with higher precision than is possible with conventional grinding methods can be achieved.

However, even magnetic grinding methods as described above cannot achieve ultrahigh precision grinding on the order of a maximum 0.01 μm. In addition, this method is inapplicable with workpieces made of a non-magnetic material.

While the magnetic grinding fluid suspended between the tip of the grinding tool and the workpiece grinding surface is moved by the high speed rotation of the grinding tool and thus grinds the workpiece surface, unavoidable fluctuations in rotational speed and axial vibrations caused by rotation of the grinding tool result in variations in the grinding depth, uneven grinding with localized variations within the grinding area, and fluctuations in the grinding area in the finish of the grinding surface, which is directly affected by the rotation of the grinding tool. Sufficient allowance must be provided in the mechanical drive mechanism to allow the rotating members to move smoothly. This allowance necessarily produces slight gaps and play which make it impossible to completely prevent variations and unevenness in the finish of the grinding surface insofar as the grinding tool is rotated at high speed.

Furthermore, the applied pressure which presses the magnetic grinding fluid against the grinding surface to produce a grinding action results from the application of a magnetic field. Because this pressure is not generated by the rotation of the grinding tool, the applied magnetic field strength must be increased to obtain a sufficient grinding action. In addition, because variations in the field strength also affect the grinding depth, the field strength must be strictly controlled, and the electromagnet or other magnetic field generating means accordingly becomes larger.

In addition, with a conventional magnetic grinding method, the magnetic grinding fluid is held between the grinding tool and the workpiece by passing magnetism from the grinding tool to the workpiece, and the workpiece itself is thus a component of the magnetic circuit. As a result, the workpiece must be made of a magnetically conductive, i.e., a magnetic material. It is to be noted that if the workpiece is a non-magnetic material, the magnetic circuit can still be formed through the non-magnetic workpiece if the workpiece is thin enough. Lenses and other optical elements, however, are both non-magnetic and typically fairly thick, and cannot therefore be processing with this conventional magnetic grinding method. Moreover, because the magnetic action of the workpiece on the magnetic grinding fluid is also dependent upon the thickness and magnetic properties of the workpiece, the workpiece also has a significant affect on the pressure applied from the magnetic grinding fluid on the workpiece surface and on the grinding finish, making it difficult to precisely control the grinding depth and grinding precision.

SUMMARY OF THE INVENTION

The present invention has been developed with a view to substantially solving the above described disadvantages and has for its essential object to provide an improved microscopic grinding device and a microscopic grinding method.

According to the present invention, a microscopic grinding device for microgrinding a workpiece with the use of magnetic grinding fluid, comprises a center yoke means, a grinding member located at one end of the center yoke, an opposed yoke means having a portion thereof located adjacent to the grinding member to create a magnetic gap between the grinding member and the opposed yoke means. A magnetic force generating means is provided for forming a magnetic field in the magnetic gap. A vibration generating means is coupled to the center yoke means for vibrating the center yoke means, whereby magnetic grinding fluid captured in the magnetic gap is vibrated to microgrind the workpiece.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 5 is a bottom view of a polishing unit shown in FIG. 4, viewed up in a direction a.

DETAILED DESCRIPTION OF THE PREFERRED EMBODIMENTS

Figure 1:
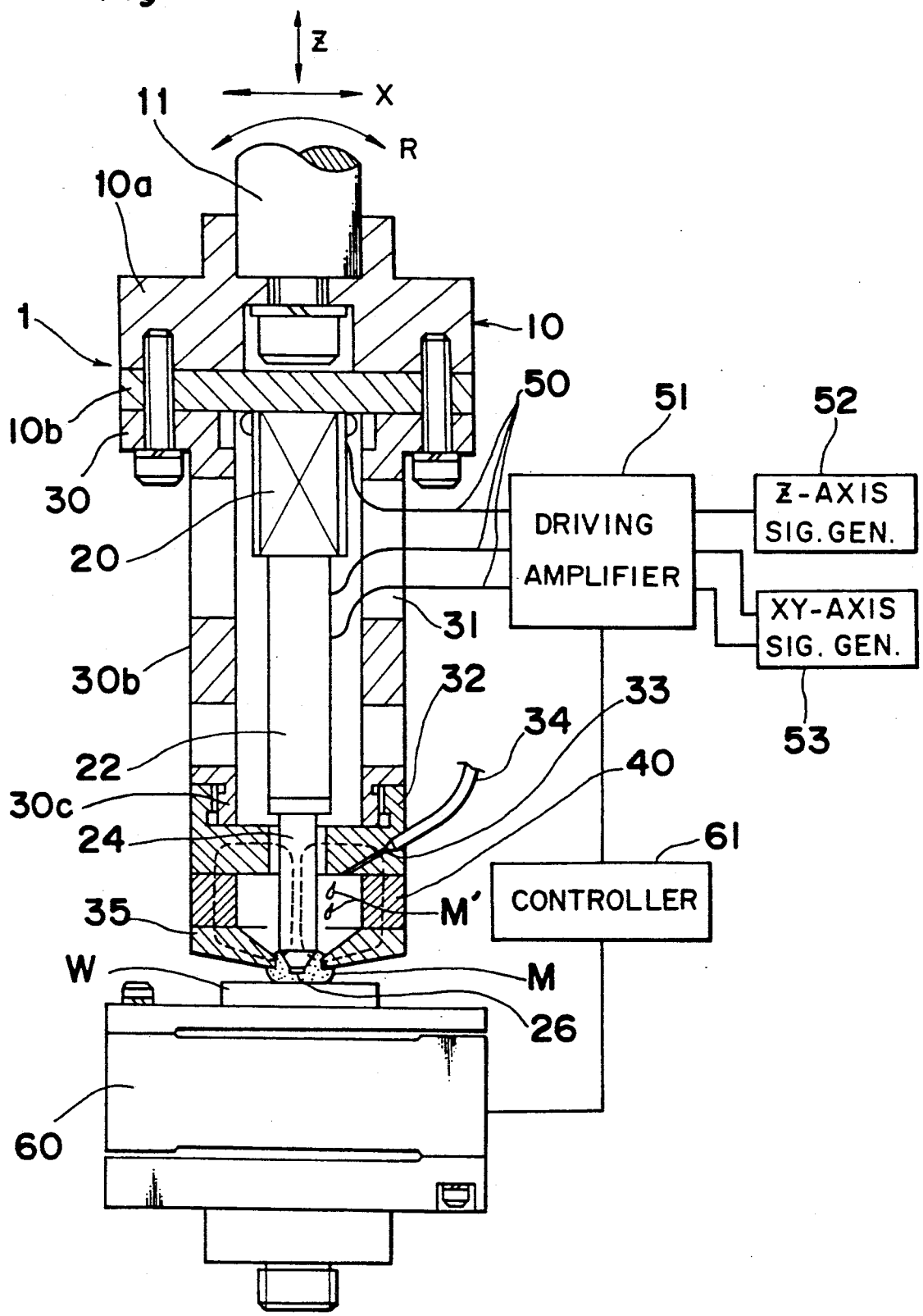
FIG. 1 is a cross sectional view showing a polishing unit with a block diagram of electric drivers and a load cell according to a first embodiment of the present invention.
Figure 2:
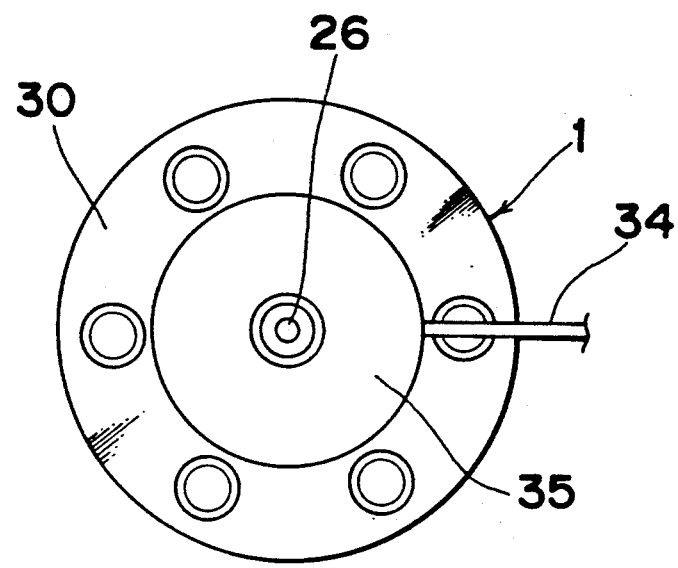
FIG. 2 is a bottom view of a polishing unit viewed up from a load cell side, shown in FIG. 1, of the present invention.

Referring to FIG. 1, a preferred embodiment of a microscopic grinding device according to the present invention is shown. The microscopic grinding device comprises a polishing unit 1, a load cell 60 and a driving amplifier 51, Z-axis signal generator 52, XY-axis signal generator 53, and a controller 61 which are connected each other to control the operation of the microscopic grinding device.

The polishing unit 1 comprises a stepped cylindrical base 10a, a base disk 10b of almost the same diameter of base 10a, a cylindrical housing 30, a connector 32, a magnet ring 40, an opposed yoke 35, a Z-axis actuator 20, an XY-axis actuator 22 and a center yoke 24 such that the base 10a, base disk 10b, cylindrical housing 30, connector 32, magnet ring 40 will construct a housing for the Z-axis actuator 20, XY-axis actuator 22 and center yoke 24.

The cylindrical housing 30 has several openings 31 in the tubular wall portion 30b for extending a electric wire therethrough. The end of tubular wall portion 30b has a protruding tube 30c which is connected to connector 32.

Figure 6A:
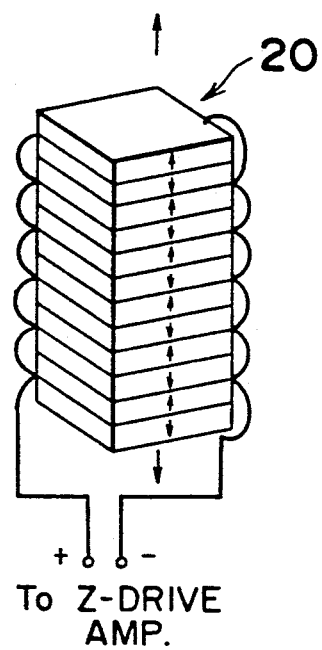
FIGS. 6a and 6b are schematic perspective views showing Z- and XY- axis actuators, respectively, according to the present invention.

Referring to FIG. 6a, an example of the Z-axis actuator made of laminated piezoelectric members is schematically shown. The Z-axis actuator 20 has multiple thin-layer piezoelectric elements laminated together, and thereby expands and contracts in the axial direction of the polishing unit 1 (direction Z as shown) when a voltage is applied.

Figure 6B:
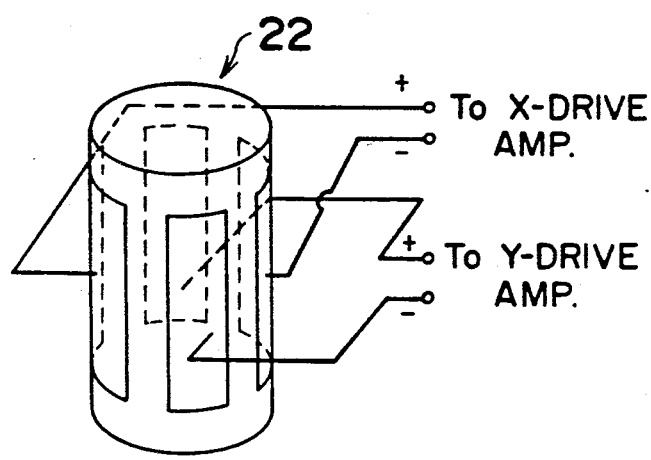

Referring to FIG. 6b, an example of the XY-axis actuator 22 is shown, which has a cylindrical column shaped piezoelectric body. The XY-axis actuator 22 comprises two pairs of opposed electrodes on the surface of the cylindrical piezoelectric body.

The X-Y axis actuator 22 is applied the bottom end of the XY-axis actuator 22 moves in a direction perpendicular to the axial direction Z of the polishing unit 1. The XY-axis actuator 22 is constructed such that a voltage can be separately applied to perpendicular X-and Y-axes in a horizontal plane crossing with the Z-axis, and by appropriately controlling the strength and direction of the voltages applied to the X- and/or Y-axis, the tip of the XY-axis actuator 22 can be moved freely throughout the horizontal plane.

An example of specifications for the XY-axis actuator 22 and the Z-axis actuator 20 is shown in Table 1 below.

TABLE 1

| Actuator | Z-direction | XY-directions |
| --- | --- | --- |
| Type | Laminated layer | Cylindrical column |
| Dimensions | 10 × 10 × 18 mm | 7.8 mm φ, length 30 mm |
| Rated voltage | 100 V | 150 V |
| Displacement | 15 μm/100 V | 4 μm from a center position |
| Excitation frequency | 10 Hz | 1000 Hz |

A rod shaped center yoke 24 is made of steel or a similar magnetic body and is fixed at one end of the XY-axis actuator 22. The end portion of the center yoke 24 is tapered, and is equipped with a polisher 26 formed, for example, by a tin plating. The polishing agent in the magnetic grinding fluid M held by this polisher 26 polishes the grinding surface of the workpiece W.

The drive lines 50 for each actuator 20 and 22 are connected to the driving amplifier 51 comprising a three channel piezoelectric driving amplifier. The actual specifications for this three channel piezoelectric driving amplifier are, for example, 350 V, 100 Ma, 30 Khz. A Z-axis signal generator 52 and XY-axis variable phase two-channel output signal generator 53 are connected to the driving amplifier 51.

Figure 7:
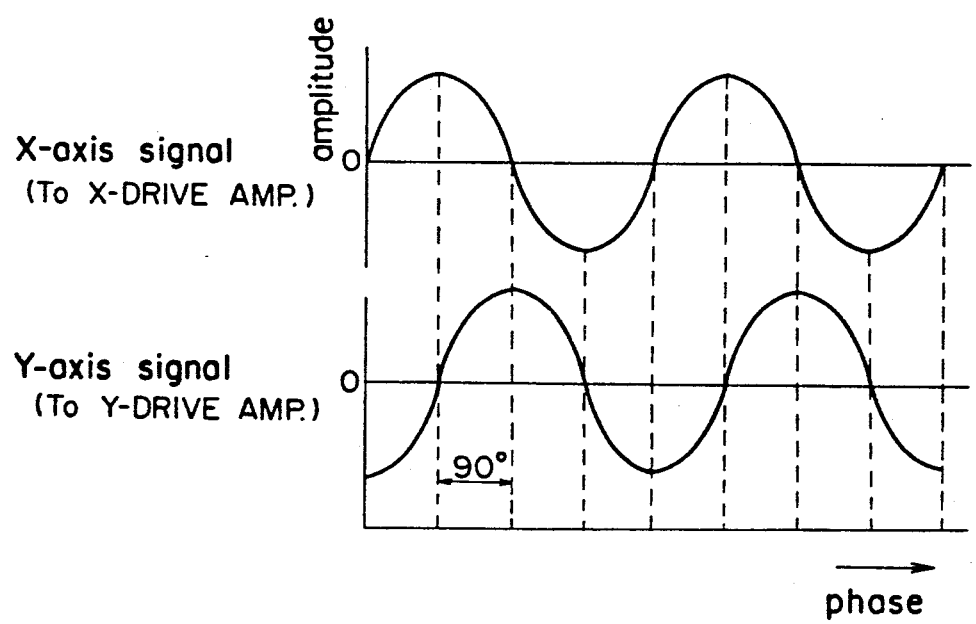
FIG. 7 is a graph showing signals produced by a XY-signal generator, according to the present invention.

Referring to FIG. 7, two signals produced by XY-axis signal generator 53 are shown. These two signals have phrases 90° different from each other and are used for effecting the deflection in X and Y directions, respectively. It is to be noted that Z-axis signal generator 52 produces a sinusoidal signal which may not be in any phase relationship with the signals for the X and Y directions.

Signals of rated frequency, as described the above, are applied from signal generators 52 and 53 via the driving amplifier 51 to the actuators 20 and 22, respectively, to control the operation of the actuator 20 and 22.

The cylindrical housing 30 made from a non-magnetic material is provided at the bottom of the base disk 10b to surround the actuators 20 and 22. A corresponding number of holes 31 are provided in the housing 30 for passage of drive wires 50 for connection with the actuator 20 and 22. A ring-shaped magnetic body connector 32 is threaded on to the bottom end of the housing 30. The connector 32 is formed so that the inside diameter of the connector 32 is made slighter larger than the outside diameter of the center yoke 24. A fluid supply passage 33 is formed in the connector 32 passing from the outside circumference to the inside circumference, and a fluid supply pipe 34 is connected to the outside end of the fluid supply passage 33. By supplying the magnetic grinding fluid to the fluid supply pipe 34, the magnetic grinding fluid M' dripped from the fluid supply passage 33 can be supplied near the outside circumference of the center yoke 24.

An annular permanent magnet ring 40 of a SmCo or other magnetic material is mounted at the bottom end of the connector 32. A magnet ring 40 with a magnetic field strength of approximately 5000 gauss is used. An opposed yoke 35 made from a magnetic body is mounted at the bottom end of the magnet ring 40. The opposed yoke 35 is conically shaped with the narrow end pointing down and the inside circumference tapered towards the tip. The opposed yoke 35 is provided opposite the center yoke 24 with a constant gap between the tip of the center yoke 24 and the inside circumference of the opposed yoke 35. A magnetic circuit is therefore formed from the magnet ring 40 to the connector 32, through the opposed yoke 35, the center yoke 24, and back to the magnet ring 40 with a donut-shaped magnetic gap formed between the center yoke 24 and the opposed yoke 35.

A load cell 60 which functions as a pressure detection means is positioned below the center yoke 24 and opposed yoke 35. The workpiece W is placed on this load cell 60 for being polished. The detection output from the load cell 60 is applied to a controller 61 from which a signal is produced to the driving amplifier 51, thereby enabling feedback control of Z-axis actuator 20 to apply a pressure acting on the workpiece W.

A magnetic polishing method using a polishing device as above is described hereinbelow.

Figure 3:
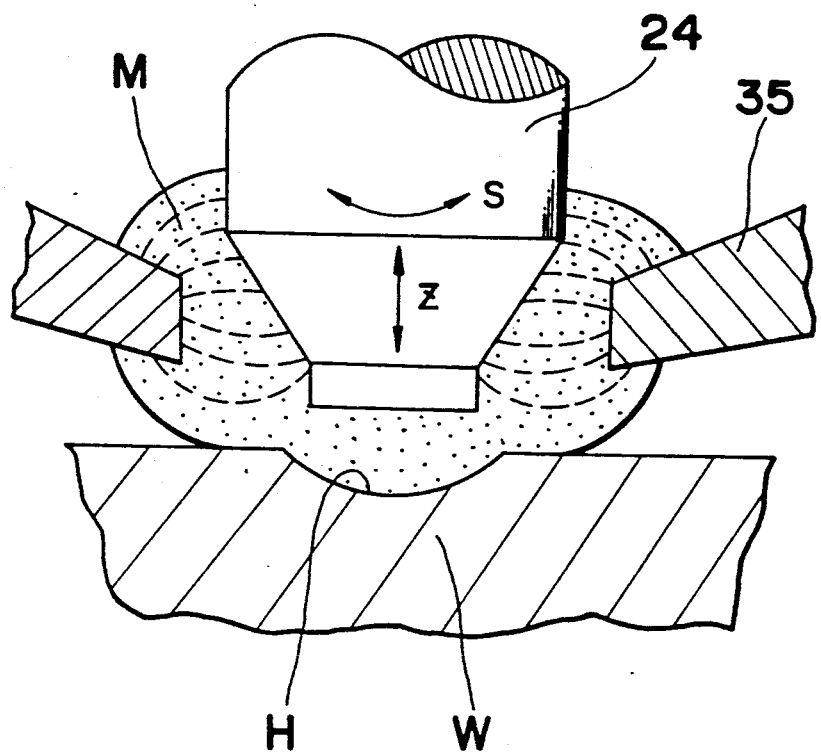
FIG. 3 is an enlarged cross sectional view of an end portion of polishing unit of FIG. 1 showing the grinding fluid reserved between a polishing unit and a workpiece, of the present invention.

In operation, the workpiece W is placed on the load cell 60, and the polishing unit 1 is then positioned over the workpiece W. When the magnetic grinding fluid M is supplied from the fluid supply pipe 34 to the tip of the center yoke 24, the magnetic grinding fluid M is magnetically held in and around the magnetic gap between the center yoke 24 and the opposed yoke 35. As illustrated in FIG. 3, because the magnetic grinding fluid M is held covering the bottom tip of the center yoke 24, the magnetic grinding fluid M is pressed against the surface of the workpiece W by magnetic force.

When a voltage is then cyclically applied to the Z-axis actuator 20, the Z-axis actuator 20 creates a compression/expansion movement in the vertical direction Z. The tip of the center yoke 24 is thus driven with a microscopic vertical stroke, applying pressure to and forcing the magnetic grinding fluid M against the surface of the workpiece W. By also cyclically applying a voltage to the XY-axis actuator 22, the tip of the center yoke 24 connected to the XY-axis actuator 22 is driven with a microscopic stroke parallel to the surface of the workpiece W. These microscopic strokes on the XY and Z axes are transferred to the magnetic grinding fluid M, and the magnetic grinding fluid M thus polishes the surface of the workpiece W. Because the magnetic grinding fluid M is pressed against and thus polishes the workpiece W at only around that part where the gap between the tip of the center yoke 24 and the workpiece W narrows most, a polished spot H of a size approximately equivalent to the shape of the tip of the center yoke 24 is formed in the workpiece W.

The applied pressure acting on the workpiece which is generated by the microscopic stroke of the center yoke 24 on the polishing unit 1 is detected by the load cell 60 on which the workpiece W is placed. The load cell 60 generates an applied pressure signal corresponding to the detected applied pressure. The applied pressure signal is fed back to the driving amplifier 51 through the controller 61. Thus, if the applied pressure acting on the workpiece W is greater than a predetermined specific value, the applied pressure acting on the workpiece W surface is reduced, for example by reducing the voltage applied to the Z-axis actuator 20 by the driving amplifier 51, so that a constant applied pressure acting on the workpiece W is constantly maintained during polishing.

If the polishing unit 1 is moved horizontally or in a three dimensional path according to the shape of a given polishing surface while maintaining this grinding action, any plane, sphere, or open curve of any radius can be freely polished.

Figure 4:
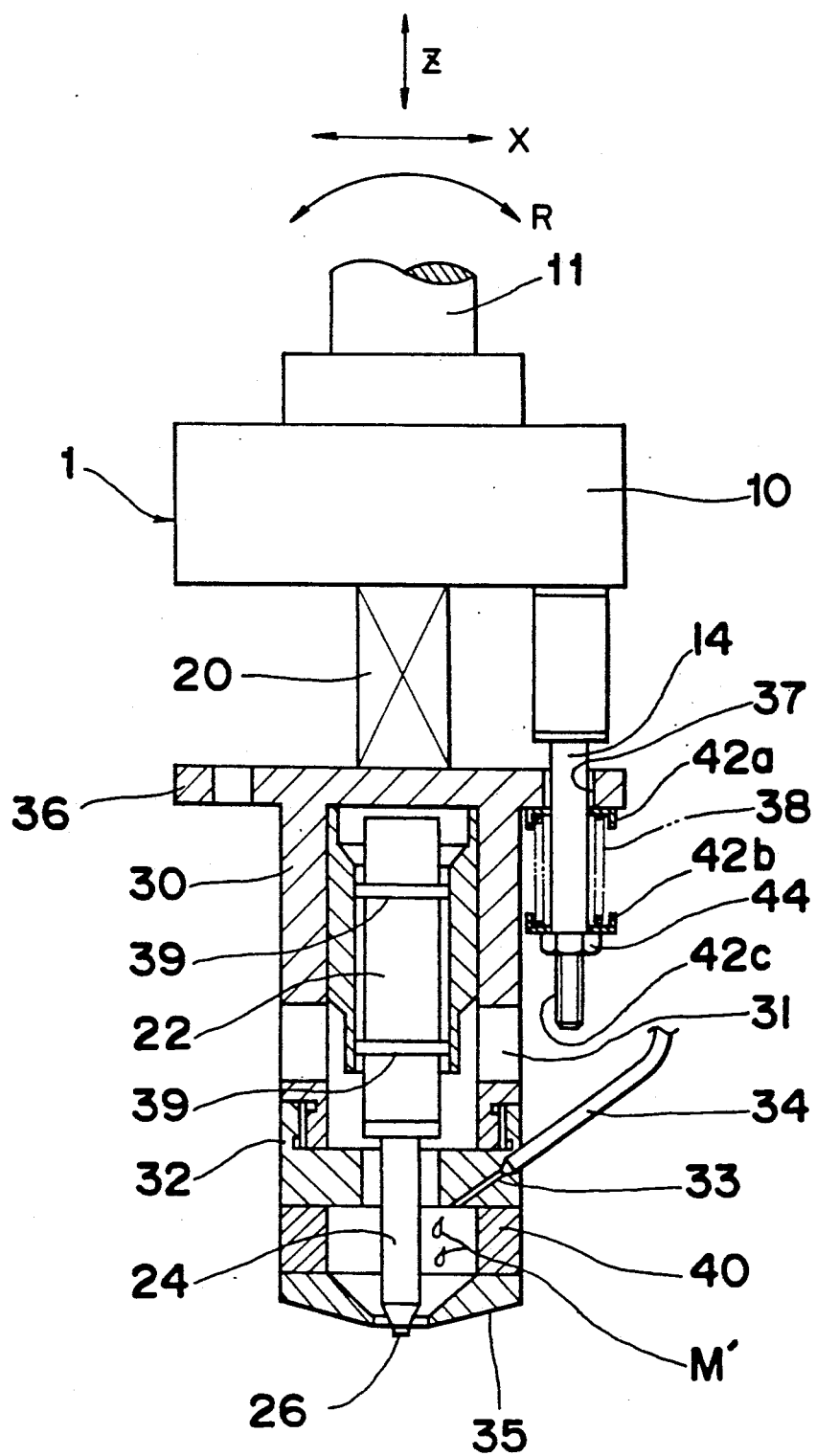
FIG. 4 is a cross sectional view showing a polishing unit of a second preferred embodiment according to the present embodiment.
Figure 5:
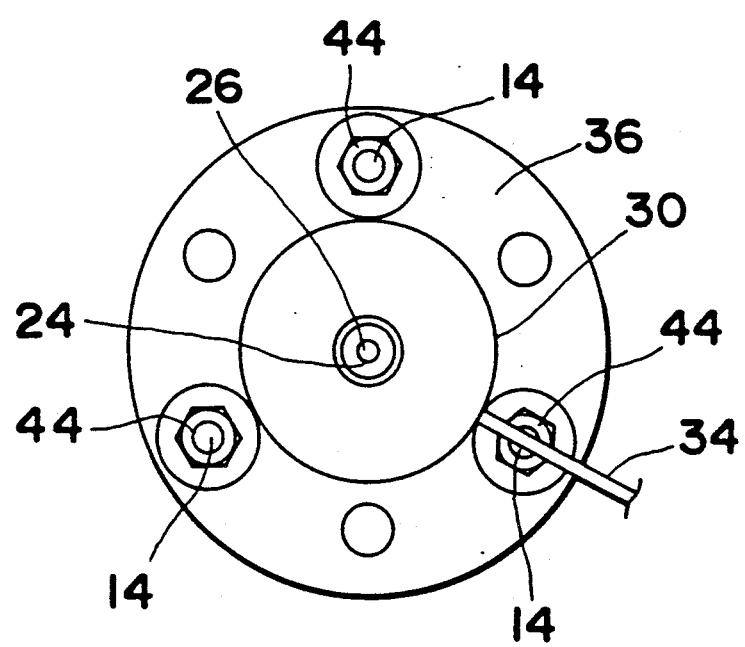

Referring to FIG. 4, a second embodiment of a polishing unit 1' according to the present invention is shown. The construction of the polishing unit 1' differs in part from that of the polishing unit 1 described hereinabove; like parts are identified with like reference numbers in FIGS. 1 and 4, and primarily those parts that differ are described below.

In this second embodiment, a cylindrical housing 30 is provided at the bottom end of the Z-axis actuator 20, the XY-axis actuator 22 is provided inside this housing 30, and the center yoke 24 is provided at the bottom end of the XY-axis actuator 22. Thus, while the action of the XY-axis actuator 22 is the same as that of the first embodiment described hereinabove, the whole housing 30, including the opposed yoke 35 and the center yoke 24, are driven integrally with a microscopic stroke when the Z-axis actuator 20 operates.

A flange 36 is provided at the top end of the housing 30, and a guide shaft 14 is provided from the bottom of the tool base 10 through the hole 37 formed through the outside member of the flange 36. A coil spring 38 is mounted on the guide shaft 14 passing through the hole 37 such that the coil spring 38 contacts the bottom of the flange 36 via a upper receptor 42a while being supported, via lower receptor 42b, by a nut 44 tightened to the threaded portion 42c of the shaft 14.

The housing 30 is thus suspended elastically on the guide shaft 14 by means of the coil spring 38. With a supporting mechanism to support the housing 30 of this type, the weight of the internal construction of the housing 30 and the housing 30 itself is balanced by the coil spring 38, enabling the compression/expansion of the Z-axis actuator 20 to be precisely transferred to the housing 30 and the housing 30 to be stably supported. In addition, the support frame 39 provided at positions 22.4% of the length from opposite ends of the XY-axis actuator 22 function as nodes of vibration of XY-axis actuator 22, and applies a stable vibration amplitude to the center yoke 24.

The microscopic grinding device of the present invention have the following features and advantages.

The polishing unit 1 is supported by a support shaft 11, and the grinding members defined by the center yoke 24 and the polisher 26, and the opposite yoke 35 on the end of polishing unit 1 are moved along the workpiece as in a conventional magnetic grinding method, but unlike the conventional method it is not necessary to rotate the polishing unit 1 at high speed. The polishing unit 1 support means 11 and movement means are common to normal magnetic grinding methods and machine tools. The polishing unit 1 can be used for grinding complex curves by moving the polishing unit 1 in a parallel (i.e., XY) direction, vertical (i.e., Z) direction, or at any angle therebetween according to the shape of the workpiece W and grinding objective.

In addition to magnetic materials such as steel, which can be ground with conventional magnetic grinding methods, this method can also be used to process workpieces made from non-magnetic materials, such as glass and ceramics, which cannot be processed with conventional magnetic grinding methods. This method is also suited to workpieces of various shapes and thicknesses from thin to thick, and the grinding surface can be processed to a plane or a curve with any radius of curvature.

The magnetic grinding fluid combines the properties of a so-called magnetic fluid with the functions of a polishing agent, and the same magnetic grinding fluid used in conventional magnetic grinding methods can be used. A common magnetic fluid is a colloidal dispersion of minute magnetic granules of $Fe_3O_4$ or a similar material with a maximum grain diameter of 10 nm in water or an oil medium. If the magnetic grains in this magnetic fluid are abrasive to the workpiece material, the magnetic fluid can be used as is for magnetic grinding. One specific example of a magnetic polishing agent powder used in a magnetic fluid is $\alpha$-$Fe_3O_4$ (rouge).

If the magnetic grains in this magnetic fluid are not abrasive to the workpiece, a common non-magnetic polishing agent powder can be suspended in the fluid. Specific examples of such polishing agent powders include $Al_2O_3$ and $SiO_2$; powders with a maximum grain diameter of 100 nm are preferred.

A magnetic circuit is provided around the grinding members 24 and 26, the opposite yoke 35, the connector 32, and the magnet ring 40 of the polishing unit 1 to magnetically hold the magnetic grinding fluid M within a space between the grinding members 24 and 26, and the opposite yoke 35 of polishing unit 1 and the workpiece; when the magnetic grinding fluid M is supplied to this magnetic circuit, magnetic force is able to hold the magnetic grinding fluid M in place. In a conventional magnetic grinding method it is necessary to form a magnetic circuit between the grinding members and the workpiece in order to press the magnetic grinding fluid against the workpiece by magnetic force and thus generate the pressure required to grind the workpiece. In the present invention, however, a magnetic force able to hold the magnetic grinding fluid M around the grinding members 24 and 26, the opposite yoke 35, the connector 32, and the magnet ring 40 is sufficient if the Z-axis actuator as described below is used. Therefore, if a magnetic yoke 35 is provided proximal to the grinding members 24 and 26 on the polishing unit 1 tip and a magnetic circuit is formed by this magnetic yoke 35 and the grinding members 24 and 26, the magnetic grinding fluid M can be held near the grinding members 24 and 26.

The actuators 20 and 22 which drive the grinding members 24 and 26 in a microscopic stroke expand and contract when a voltage is applied, i.e., the actuator is a piezoelectric or electrostrictive element. By linking the grinding members 24 and 26 to such actuators 20 and 22 and applying a cyclically variable voltage to the actuators 20 and 22, the grinding members 24 and 26 can be driven with a microscopic stroke. The frequency and amplitude of the microscopic actuator stroke vary according to the frequency and strength, respectively, of the applied voltage.

The microscopic stroke of the grinding members 24 and 26 is transferred to the magnetic grinding fluid M, producing the same microscopic stroke in the magnetic grinding fluid M, and thus polishing the surface of workpiece W. The Z-axis actuator 20 moves the grinding members 24 and 26 in Z direction perpendicular to the grinding surface, causing the magnetic grinding fluid M to collide with the workpiece W from a vertical direction and thus applies pressure to the surface of workpiece W. The applied pressure acting on the workpiece surface can therefore be controlled by the strength of the voltage applied to the Z-axis actuator 20.

The pumping action of the magnetic grinding fluid M caused by the microscopic stroke of the Z-axis actuator 20 causes the magnetic grinding fluid M to be successively supplied to the grinding surface of the workpiece W. The XY-axis actuator 22 moves the grinding members 24 and 26 along an X-axis and a Y-axis perpendicular to the X-axis, and thus grinds the surface of the workpiece W by moving the magnetic grinding fluid parallel to the grinding surface of the workpiece W. The movement of the grinding members 24 and 26 causes by the XY-axis actuator can be in a single direction on either the X-axis or the Y-axis, or a compound action combining simultaneous movement on both the X-axis and Y-axis. For example, by controlling the phase of movement in the X and Y directions, a Lissajous pattern action can be produced.

While it is preferable for the microscopic stroke of the grinding members 24 and 26 to be executed simultaneously in the Z and XY directions, grinding is possible with movement in only one (Z or XY) direction.

A microscopic grinding method according to the present invention detects the pressure applied from the magnetic grinding fluid M to the workpeice W by means of a load cell 60 as a pressure detector which outputs an applied pressure signal. This signal is used to control the operation of the actuators 20 and 22, and thereby control the pressure applied to the workpiece surface.

The pressure applied from the magnetic grinding fluid M to the workpiece W is determined by the magnetic retention force and the Z-axis actuator 20. The load cell 60 which detects this applied pressure can be replaced with any common pressure sensor built in to a variety of mechanical devices so long as it is of a type that is able to detect pressure applied to the workpiece W in a vertical direction. For example, if grinding is done with the workpeice W on a load cell 60, the pressure applied to the workpeice W can be detected by the load cell 60 and extracted as an electrical signal.

The applied pressure detected by the load cell 60 is converted to an electrical signal and used to drive the actuators 20 and 22. Specifically, the detection signal is processed by a suitable electrical circuit, and input to the drive circuit that applies the voltage to the actuators 20 and 22. The detected applied pressure is compared with a specific applied pressure in the drive circuit to control any increase or decrease in the voltage applied to the Z-axis actuator 20. In other words, feedback control is used to control the applied pressure resulting from the Z-axis actuator 20.

The applied pressure setting is appropriately determined according to the material of workpiece W, the grinding precision, and other parameters.

A microscopic polishing unit 1 comprises the center yoke 24, the tip of which comprises the polisher, an opposed yoke 35 to create a magnetic gap around the polisher 26, a magnetic generator supplying magnetism to yokes 24 and 35, the XY axis actuator 22 comprising an electrostrictive element which drives the grinding members 24 and 26 with a microscopic stroke in the X-Y axis, and the Z axis actuator 20 comprising an electrostrictive element which drives the grinding members 24 and 26 with a microscopic stroke in the Z axis.

The center yoke 24 is the member which transfers a microscopic stroke to the magnetic grinding fluid M held between the polisher 26 on the tip of center yoke 24 and the workpiece W, causing the workpiece W to be ground to a shape corresponding to the shape of the grinding members 24 and 26. The polisher provided on the tip of the center yoke 24 may be comprised of a tin plating layer or polyurethane. The center yoke 24 itself is one member of the magnetic circuit, and is therefore made from a magnetic material.

The opposed yoke 35 is provided with a gap, which becomes the magnetic gap, to the polisher 26 on the tip of the center yoke 24. For example, if an annular opposed yoke 35 is provided so that it surrounds a round center yoke 24 with a gap therebetween, the magnetic grinding fluid can be suitably held around the grinding member of the center yoke. It is to be noted that a rod- or sheet-shaped opposed yoke 35 can also be positioned beside the center yoke 24. The opposed yoke 35 is also part of the magnetic circuit, and is therefore made from a magnetic material. If the end member of the opposed yoke 35 in direct opposition to the center yoke 24 is conically shaped, the magnetic field can be focused at the tip of the opposed yoke 35.

The magnetic circuit is formed by linking the center yoke 24 and the opposed yoke 35 with the magnet ring 40 as a magnetic generator. The magnetic generator may be a permanent magnet or an electromagnet, but because it is necessary to shift the axis and control the strength of the magnetic field in the present invention, a permanent magnet is preferred because the construction of the device can be simplified. An Sm-Co magnet or similar magnet can be used for the permanent magnet.

The XY-axis actuator 22 and Z-axis actuator 20 are provided between the fixed member supporting the center yoke 24 and the center yoke 24, and drive the center yoke 24 with a microscopic stroke in the vertical and horizontal directions. A curved piezoelectric element can be used as the XY-axis actuator 22. By connecting separate voltage lines to this curved piezoelectric element for the X and Y directions, the tip of the piezoelectric element can be driven with a microscopic stroke in the X and Y directions by applying a voltage to the X and Y voltage lines, respectively.

A laminated piezoelectric element can be used as the Z-axis actuator 20. A voltage applied to both ends of this laminated piezoelectric element causes the element to expand and contract. The drive lines which apply a voltage to the XY-axis actuator 22 and the Z-axis actuator 20 are connected to the driving amplifier 51 and function generators of Z-axis signal generator 52 and XY-axis signal generator 53. The construction of this drive circuit or drive mechanism may be the same as that of any actuator using a piezoelectric element in a common mechanical device. In the case of the XY-axis actuator 20, by appropriately controlling the phase of the applied voltage in the X and Y directions, the path of the tip of the XY-axis actuator 22, i.e. the grinding members 24 and 26, can be freely controlled to trace a simple linear path or a complex path such as that of a Lissajous pattern.

Operation

In a magnetic grinding method according to the present invention, the workpiece W is ground by a magnetic grinding fluid M or polishing agent granules in a magnetic grinding fluid M by pressing a magnetic grinding fluid M against and moving the magnetic grinding fluid M along the surface of the workpiece W. Furthermore, in a conventional magnetic fluid grinding method M, the pressure which forces the magnetic grinding fluid M against the workpiece W is generated by a magnetic field applied between the grinding members 24 and 26 of the polishing unit 1 and the workpiece W, and the magnetic grinding fluid M is moved along the surface of the workpiece W by the high speed rotation of the polishing unit 1.

However, in a microscopic grinding method according to the present invention, the grinding members 24 and 26 of the polishing unit 1 is driven with a microscopic stroke by the XY-axis actuator 22 and/or the Z-axis actuator 20; this microscopic stroke is transferred to the magnetic grinding fluid M to move the magnetic grinding fluid M in vertical and horizontal directions with respect to the grinding surface of the workpiece W. In other words, the microscopic stroke in the direction perpendicular to the workpiece surface applies pressure to the grinding surface, and by moving the magnetic grinding fluid M parallel to the grinding surface by a horizontal microscopic stroke, the polishing agent in the magnetic grinding fluid M is moved along the workpiece surface.

As a result, variations in grinding depth and surface roughness resulting from fluctuations in rotational speed and axial vibrations do not occur because the polishing unit 1 is not rotated at high speed. An electrostrictive element actuators has no mechanical moving parts or mechanisms and can be operated with extremely high precision by controlling the applied voltage, thereby resulting in stable movement of the magnetic grinding fluid. There are, therefore, no variations or unevenness in the finished polished surface. Furthermore, the movement of the magnetic grinding fluid M controlled by the actuators 20 and 22 is significantly less than that caused by the rotation of the polishing unit in a conventional method, thereby enabling finer polishing of the workpiece, and production of ultrahigh precision mirror surfaces with extremely fine surface roughness.

Next, if an applied pressure forcing the magnetic grinding fluid M against the workpiece surface is generated by an electrostrictive element Z-axis actuator 20, it is not necessary to form a magnetic circuit which includes the polishing unit 1 and the workpiece W. As a result, this microscopic grinding method can be used with equal results even with workpieces made from non-magnetic materials. In addition, the material from which the workpiece W is made and the shape of the workpiece have no affect on grinding efficiency or precision because the applied pressure of the magnetic grinding fluid acting on the workpiece W can be set by controlling only the voltage applied to the actuators 20 and 22 and is unaffected by differences in the material, thickness, or magnetic properties of the workpiece.

In a microscopic grinding method according to the present invention, the pressure applied from the grinding members 24 and 26 to the workpiece W via the magnetic grinding fluid M by driving the Z-axis actuator 20 is detected by the load cell 60 as a pressure detection means, and the resulting information is fed back to the Z-axis actuator drive controller 61. As a result, the pressure applied from the Z-axis actuator to the workpiece can be precisely controlled at a preset constant value throughout the grinding process. Since this applied pressure is the parameter with the greatest affect on grinding depth and precision, higher precision grinding can be achieved by precisely controlling this applied pressure.

In particular, because the magnetic grinding fluid M is held in a magnetic gap between the center yoke 24 and the opposed yoke 35, the complete magnetic circuit, including the magnet ring 40 as a magnetic field generator, can be incorporated within the polishing unit 1, and it is not necessary to provide a large, complex magnetic circuit connected to the workpiece and workpiece table as in a conventional magnetic grinding method.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A microscopic grinding device for microgrinding a workpiece with the use of magnetic grinding fluid, comprising:
   a center yoke means;
   a grinding member located at one end of said center yoke means;
   an opposed yoke means having a portion thereof located adjacent to said grinding member to create a magnetic gap between said grinding member and said opposed yoke means;
   a magnetic force generating means for forming a magnetic field in said magnetic gap;
   a vibration generating means coupled to said center yoke means for vibrating said center yoke means, whereby magnetic grinding fluid captured in said magnetic gap is vibrated to microgrind said workpiece.

2. A microscopic grinding device as claimed in claim 1, wherein said vibration generating means comprises:
   an XY axis vibration means for vibrating said center yoke means in XY directions; and
   a Z axis vibration means for vibrating said center yoke means in Z direction.

3. A microscopic grinding device as claimed in claim 2, wherein each of said XY axis vibration means and said Z axis vibration means comprises an electrostrictive member.

4. A microscopic grinding device as claimed in claim 3, wherein said electrostrictive member is a piezoelectric member.

5. A microscopic grinding device as claimed in claim 1, further comprising a cylindrical housing means having a first end closed for fixedly holding said vibration generating means and a second end open for inserting said center yoke means.

6. A microscopic grinding device as claimed in claim 5, wherein said opposed yoke means is connected to said second end of said housing means.

7. A microscopic grinding device as claimed in claim 1, further comprising a pressure detecting means for producing a pressure signal indicative of a pressure applied to said workpiece by said center yoke means.

8. A microscopic grinding device as claimed in claim 7, further comprising a feedback means for feeding said pressure signal back to said vibration generating means, thereby maintaining said pressure within a predetermined range.

9. A microscopic grinding device as claimed in claim 1, wherein said opposed yoke means comprises an opposed yoke, a magnet ring and a connector, said magnet being sandwiched between said opposed yoke and said connector.

10. A method for microgrinding a workpiece with the use of magnetic grinding fluid such that said magnetic grinding fluid is actuated by a grinding means driven by a vibration generating means, said method comprising the steps of:
    magnetically holding said magnetic grinding fluid between said workpiece and said grinding member;
    vibrating said grinding member in directions parallel and perpendicular to a grinding surface of said workpiece; and
    transmitting said vibration of said grinding member to said magnetic grinding fluid for grinding said workpiece.

11. A method as claimed in claim 10, further comprising the steps of;
    detecting a pressure applied to said workpiece by said grinding member via said magnetic grinding fluid;
    producing a pressure signal indicative of said pressure; and
    controlling said vibration generating means in relation to said pressure signal, thereby maintaining said pressure within a predetermined range.

* * * * *

UNITED STATES PATENT AND TRADEMARK OFFICE
CERTIFICATE OF CORRECTION

PATENT NO. : 5,076,026

DATED : December 31, 1991

INVENTOR(S) : Shinichi MIZUGUCHI et al.

It is certified that error appears in the above-identified patent and that said Letters Patent is hereby corrected as shown below:

Title page  line [73], for "Electrical Industrial Co., Ltd. Matsushita", read --Matsushita Electric Industrial Co., Ltd.--

Signed and Sealed this

First Day of June, 1993

Attest:

MICHAEL K. KIRK

Attesting Officer

Acting Commissioner of Patents and Trademarks